Patented Aug. 14, 1945

2,382,425

UNITED STATES PATENT OFFICE 2,382,425

PROCESS FOR THE PRODUCTION OF UNSATURATED BODIES FROM HEXOSE OXIDATION PRODUCTS

William F. Koch, Detroit, Mich.

No Drawing. Application August 13, 1940,
Serial No. 352,410

1 Claim. (Cl. 260—550)

My invention relates to the production of unsaturated bodies such as ketenes and ketene derivatives from hexose oxidation products.

Such oxidation products are exemplified by carbon chains with two and three carbon atoms carrying hydroxyl or carbonyl groups. Examples of such oxidation products are acetaldehyde, ethyl alcohol, ethyl ether, acetone, glyceric aldehyde, etc.

When these oxidation products are oxidized with an oxidizing mineral acid at an elevated temperature under proper conditions they are converted to aldehydes and then to ketenes.

Broadly speaking my invention comprehends the production of unsaturated bodies such as ketenes and ketene derivatives from hexose oxidation products by mixing the oxidation product with a strong mineral acid such as concentrated and fuming sulphuric acid or phosphoric acid, heating to within the temperature range of 100° to 400° C. and rapidly removing the resultant reaction products from the reaction chamber and cooling to below pyrolysis temperature.

In practicing my invention and assuming, for example, that I desire to employ a hexose oxidation product such as ethyl ether as the starting material:

Example A

First I mix the ethyl ether with fuming and concentrated sulphuric acid (1.8 S. G.) or 80–85% phosphoric acid, just as desired, in the following proportions:

| | Parts by volume |
|---|---|
| Ethyl ether | 1 |
| Concentrated sulphuric acid | 2 |
| or | |
| Ethyl ether | 1 |
| Phosphoric acid (80–85%) | 4 or more |

This mixture is placed in a distilling flask which is connected to a condensing system, the flask being provided with an inlet for the passage of a sweep gas or a carrier gas such as carbon dioxide or sulphur dioxide.

With the distilling flask being heated to raise the temperature of the contained mixture to within a temperature range of 100° to 400° C. to effect the desired reaction, the sweep gas is run into the distilling flask to carry the reaction products, resulting from the heating of the mixture, out of the reaction zone as quickly as possible and into the condenser. The reaction products condensing in this condenser collect in a trap at the bottom of the condenser, the specific bodies caught being diacetal of ketene, ketene sulphurous acid addition products and polymers of ketenes—all ketene derivatives. The gases not condensing in this condenser pass to another condenser where they are condensed by dry ice, for example, to a very low temperature (−80° C.), the condensed material collecting in a flask in the form of liquid ketenes and other unsaturated bodies.

I find in practice that it is advantageous to contact the sweep gas with slightly warmed acetaldehyde before the sweep gas enters the distilling flask. In accordance with my invention, the ethyl ether, when employed as the starting material, is first in part converted to acetaldehyde. Consequently if the sweep gas is saturated with acetaldehyde before it enters the distilling flask, it will be apparent that more ketenes will be produced on a single run than where merely carbon dioxide or sulphur dioxide is employed as the sweep gas. I find also that when some acetaldehyde is carried with the sweep gas, the action in the distilling flask is smoother and more uniform and more controllable.

With respect to the use of acetaldehyde as a starting material:

It is to be noted that acetaldehyde reacts with troublesome vigor with concentrated oxidizing mineral acids such as the sulphuric and phosphoric acids above referred to. It is desirable, therefore, to contact the acetaldehyde in dilute form with the acid.

To this end I may pass gaseous acetaldehyde directly into the acid in the distilling flask, or I may entrain it with the carbon dioxide or sulphur dioxide used as a sweep gas.

I prefer, however, to proceed as follows:

Example B

I first dilute the acetaldehyde with ethyl alcohol and ethyl ether, in the following proportions, or thereabouts:

| | Parts by volume |
|---|---|
| Acetaldehyde | 1 |
| Ethyl alcohol | 1 |
| Ethyl ether | 3 |

I then prepare a mixture composed of fuming sulphuric acid and concentrated sulphuric acid in the following proportions:

| | Parts by volume |
|---|---|
| Fuming sulphuric acid | 1 |
| Concentrated sulphuric acid | 2 |

The two mixtures in the following proportions:

| | Parts by volume |
|---|---|
| Acetaldehyde-alcohol-ether mixture | 1 |
| Acid mixture | 3 | are charged into the distilling flask, and I then proceed as described in connection with ethyl ether.

Should phosphoric acid be employed in this example, instead of sulphuric acid, I use at least four parts by volume of acid as distinguished from the three parts employed when using sulphuric acid.

In conclusion and for purposes of clarity I might add that in connection with the carbon dioxide or the sulphur dioxide gas, the same:

(a) Functions as a sweep gas for the rapid removal of the reaction products from the distilling flask;

(b) Functions as a carrier gas for conveying acetaldehyde into the distilling flask;

(c) Forms addition products with the ketenes in the distilling flask to preserve the same against polymerization.

With respect to the ethyl alcohol, the same:

(a) Dilutes the aldehyde to reduce the vigor of the reaction;

(b) Forms diacetal of ketenes to preserve against polymerization;

(c) Is converted to acetaldehyde and then to ketenes, thus increasing yield.

With respect to the ethyl ether, the same:

(a) Dilutes the aldehyde;

(b) Is slowly converted to acetaldehyde and then to ketenes, to increase yield.

It is to be understood that changes may be made in the proportions of materials and in the detailed procedures above described within the purview of my invention.

This application is a continuation-in-part of my copending application Serial No. 202,469, filed April 16, 1938, Patent 2,257,748.

What I claim is:

The process of producing ketenes and ketene derivatives, which process comprises preparing a mixture of acetaldehyde, one part; ethyl alcohol, one part; and ethyl ether, three parts, by volume, preparing an acid mixture of fuming sulphuric acid, one part, and concentrated sulphuric acid, two parts, by volume, combining the mixtures in the proportions of one part of the aldehyde mixture to three parts of the acid mixture, heating the mixture to within the temperature range of 100° C. to 400° C., to effect chemical reaction of the materials of the mixture, removing the reaction products as formed, and immediately chilling to below pyrolysis temperature.

WILLIAM F. KOCH.